Aug. 11, 1942.　　　T. R. KOMLINE　　　2,292,572
CENTRIFUGAL ATOMIZER
Filed July 16, 1940
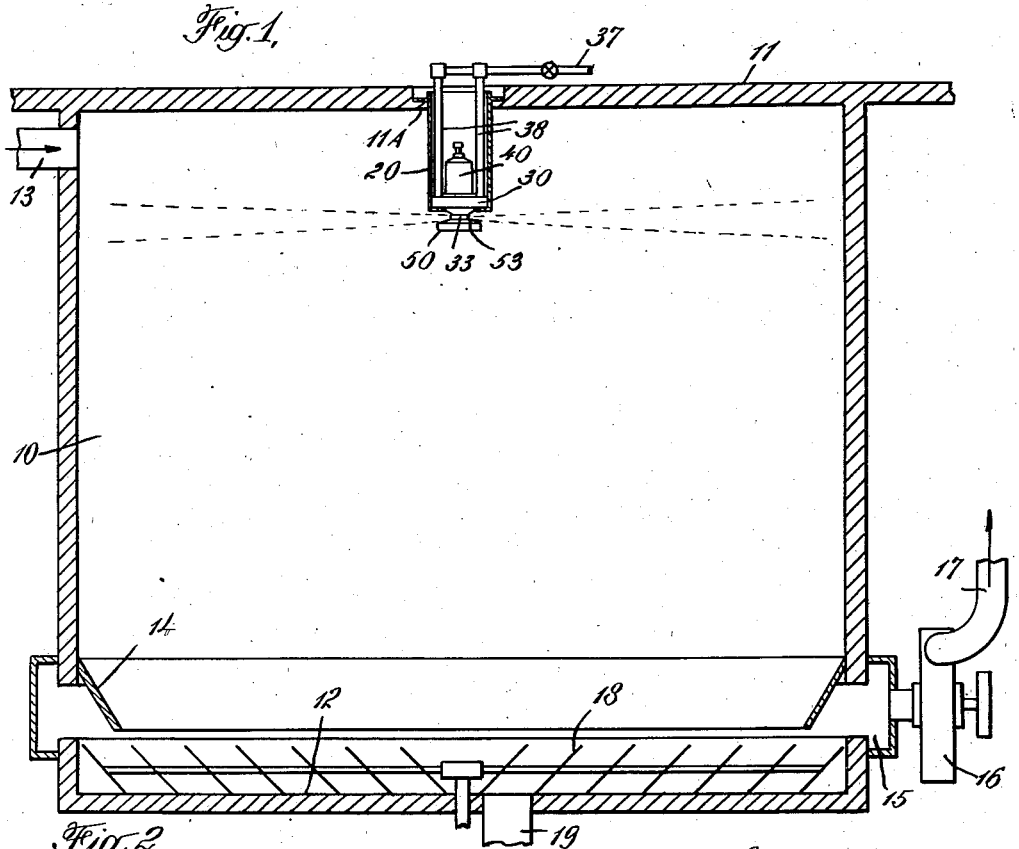
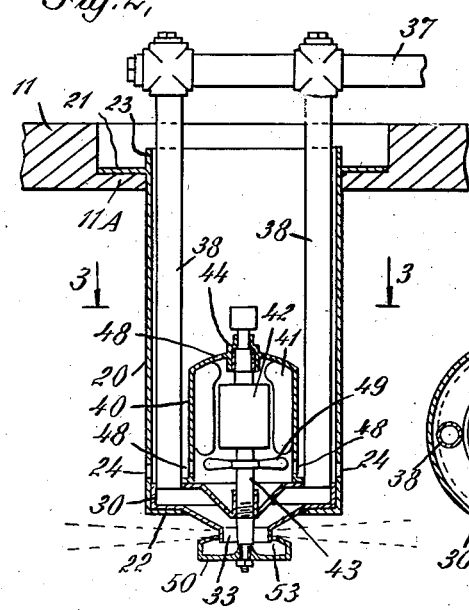
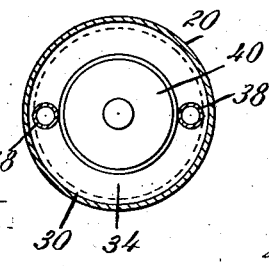
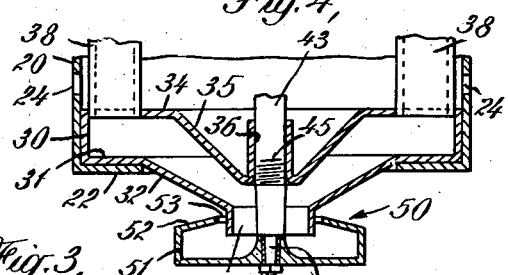
INVENTOR
Thomas R. Komline
BY
Marshall & Hawley
ATTORNEYS Patented Aug. 11, 1942

2,292,572

UNITED STATES PATENT OFFICE 2,292,572

CENTRIFUGAL ATOMIZER

Thomas R. Komline, Middlesex, N. J., assignor of one-half to John R. Downes, Borough of Middlesex, N. J.

Application July 16, 1940, Serial No. 345,711

7 Claims. (Cl. 299—63)

This invention relates to improvements in centrifugal atomizer, and its object is to provide a simple and sturdy machine for the mechanical atomization of fluids, especially for use in a spray drier.

A specific object of the invention is to provide an apparatus for spraying sewage sludge into a drying chamber, which without any screens or similar restricted passages which are readily clogged up, is capable of breaking up solid particles in the sludge and of throwing the sludge outwardly in a finely comminuted condition in which it is readily dried.

Another object is to produce a device for the aforesaid purpose which will dispense with the need of passing the sludge through a grinder before it is led to the atomizer.

These and other objects of the invention will appear from the following specification in which I will describe the invention, the novel features of which will be pointed out in appended claims.

Referring to the drawing,

Fig. 1 is a sectional elevation on a small scale and more or less diagrammatic of a drying chamber of ordinary construction with an atomizer therein which is made according to and embodies my invention;

Fig. 2 is a sectional elevation on a larger scale of the atomizer shown in Fig. 1;

Fig. 3 is a plan view of the apparatus shown in Fig. 2; and

Fig. 4 is a sectional elevation on a still larger scale of the lower part of the atomizer.

10 designates a drying chamber over which is a floor 11 which forms its ceiling and under which is a floor 12. 13 is a flue for leading hot gases into the chamber. 14 is a baffle near the base of the chamber outside of which is an annular space 15 from which the flue gases are drawn by a fan or blower 16 from which they are led to a chimney through a conduit 17. This fan keeps the pressure within the drying chamber slightly below atmospheric. 18 is a scraping device at the base of the chamber for moving dried material which settles on the floor 12 to a discharge conduit 19.

20 designates a cylindrical shell having an outwardly extending flange 21 near its upper end and an inwardly extending flange 22 at its lower end. This shell extends through an opening in the wall which forms the ceiling of the heating chamber. A ledge 11A is formed around this opening on which the flange 21 rests to support the atomizer. A portion 23 of the shell extends above the flange 21 to keep dirt from the floor 11 from falling into the shell.

A hollow inner casing closes the lower end of the shell 20. This casing has a cylindrical side 30 which fits into the shell 20 and a base 31 which rests on the flange 22. 32 is a wall extending inwardly and downwardly from the base 31 and its lower edge is bent downwardly to form an axially central discharge spout 33. A top plate extends horizontally inwardly from the side 30, as at 34, and thence inwardly and downwardly, as at 35. Its lower edge is bent upwardly to form a shaft bearing 36 in axial alinement with the spout 33. 37 is a supply pipe from which feed pipes 38, 38 extend through the top plate 34 into the annular space between the walls 32 and 35.

40 is a motor casing, the lower edge of which rests on the top plate 34. 41 designates the fields of the motor and 42 its armature. The latter is mounted on a vertical shaft 43 which extends through the bearing 36. Its upper end is supported in bearings 44 on the upper end of the casing 40. The lower part of that portion of the shaft which extends through the bearing 36 is threaded, as at 45, in such a direction as to tend to move downwardly any sludge which gets between the shaft and its bearing at this place.

The lower end of the shaft is tapered, as at 46, and supports a spray bowl 50 which is forced onto the shaft by a nut 47. The spray bowl is under and surrounds the discharge spout 33. It has an upstanding cylindrical side 51 and an inwardly and upwardly inclined top 52 with a cylindrical opening of such a size as to form an annular space 53 around the outside of the spout 33.

The operation of this apparatus is obvious. Sludge introduced into the lower casing at two diametrically opposite points is evenly distributed therein and is discharged into the spray bowl which is rotated at sufficiently high rate of speed as to throw the sludge outwardly with enough force to break up the sludge and deliver it into the drying chamber in a finely comminuted condition.

Vents 48, 48 are provided in the upper and lower parts of the motor casing 40 and other vents 24 provided in the shell 20. The negative pressure in the drying chamber will cause a movement of air from the control room down shell 20, through the motor casing and out through the drying chamber. This circulation can be increased by means of a fan 49 on the motor shaft.

Structural modifications can be made within the spirit and scope of this invention and I intend no limitations other than those imposed by the following claims.

What I claim is:

1. A centrifugal atomizer comprising an open ended shell, a hollow casing at the lower end of the shell forming a vertical shaft bearing and a surrounding annular space and terminating in a downwardly directed circular discharge spout, a shaft extending through said bearing and spout and a spray bowl on the shaft below the spout closed at the bottom and having a peripheral portion extending upwardly above the lower end of the spout, said bowl having a portion extending inwardly toward the spout constructed with a circular opening of larger diameter than the outer diameter of the spout.

2. A centrifugal atomizer comprising an open ended shell, a hollow casing at the lower end of the shell forming a vertical shaft bearing and a surrounding annular space and having a downwardly sloping portion terminating in a downwardly directed circular discharge spout, a shaft extending through said bearing and spout and a spray bowl on the shaft below the spout closed at the bottom and having a peripheral portion extending upwardly above the lower end of the spout, said bowl having an upwardly sloping portion extending inwardly toward the spout constructed with a circular opening of larger diameter than the outer diameter of the spout.

3. A centrifugal atomizer comprising an open ended shell, a hollow casing at the lower end of the shell forming a vertical shaft bearing and a surrounding annular space and terminating in a downwardly directed circular discharge spout, a shaft extending through said bearing and spout, the lower part of the portion of the shaft which extends through the bearing being threaded in a direction to move material around the shaft downwardly, and a spray bowl on the shaft below the spout closed at the bottom and having a peripheral portion extending upwardly above the lower end of the spout, said bowl having a portion extending inwardly toward the spout constructed with a circular opening of larger diameter than the outer diameter of the spout.

4. A centrifugal atomizer comprising an open ended shell, a hollow casing at the lower end of the shell forming a vertical shaft bearing and a surrounding annular space and terminating in a downwardly directed circular discharge spout, diametrically opposed feed pipes extending through the shell into said lower casing, a shaft extending through said bearing and spout and a spray bowl on the shaft below the spout closed at the bottom and having a peripheral portion extending upwardly above the lower end of the spout, said bowl having a portion extending inwardly toward the spout constructed with a circular opening of larger diameter than the outer diameter of the spout.

5. A centrifugal atomizer comprising an open ended shell having an element projecting outwardly below its upper edge, adapted to engage a supporting ledge, a hollow casing at the lower end of the shell forming a vertical shaft bearing and a surrounding annular space and terminating in a downwardly directed circular discharge spout, an inwardly extending element at the lower end of the shell adapted to support said hollow casing, a shaft extending through said casing and a spray bowl on the shaft below the spout closed at the bottom and having a peripheral portion extending upwardly above the lower end of the spout, said bowl having a portion extending inwardly toward the spout constructed with a circular opening of larger diameter than the outer diameter of the spout.

6. A centrifugal atomizer comprising an open ended shell constructed to form air vents above its lower end, having an element projecting outwardly below its upper edge adapted to engage a supporting ledge, a hollow casing at the lower end of the shell forming a vertical shaft bearing and a surrounding annular space and terminating in a downwardly directed circular discharge spout, an inwardly extending element at the lower end of the shell adapted to support said hollow casing, a shaft extending through said casing, a motor on said shaft, a hollow motor casing supported on said lower casing constructed to form air vents at its upper and lower portions, and a spray bowl on the shaft below the spout closed at the bottom and having a peripheral portion extending upwardly above the lower end of the spout, said bowl having a portion extending inwardly toward the spout constructed with a circular opening of larger diameter than the outer diameter of the spout.

7. A centrifugal atomizer comprising an open ended shell constructed to form air vents above its lower end, having an element projecting outwardly below its upper edge adapted to engage a supporting ledge, a hollow casing at the lower end of the shell forming a vertical shaft bearing and a surrounding annular space and terminating in a downwardly directed circular discharge spout, an inwardly extending element at the lower end of the shell adapted to support said hollow casing, a shaft extending through said casing, a motor on said shaft, a hollow motor casing supported on said lower casing constructed to form air vents at its upper and lower portions, a fan on the shaft arranged to increase the circulation of air through said vents, and a spray bowl on the shaft below the spout closed at the bottom and having a peripheral portion extending upwardly above the lower end of the spout, said bowl having a portion extending inwardly toward the spout constructed with a circular opening of larger diameter than the outer diameter of the spout.

THOMAS R. KOMLINE.